United States Patent [19]

Krall

[11] Patent Number: 5,621,299

[45] Date of Patent: Apr. 15, 1997

[54] RECHARGEABLE BATTERY POWER SUPPLY WITH LOAD VOLTAGE SENSING, SELECTABLE OUTPUT VOLTAGE AND A WRIST REST

[75] Inventor: David A. Krall, 340 Schroeder Ave., Sunnyvale, Calif. 94086

[73] Assignee: David A. Krall, Sunnyvale, Calif.

[21] Appl. No.: 339,128

[22] Filed: Nov. 14, 1994

Related U.S. Application Data

[63] Continuation-in-part of Ser. No. 188,471, Jan. 27, 1994, abandoned.

[51] Int. Cl.$^6$ .............................. H01M 10/44; H02J 7/04
[52] U.S. Cl. .................... 320/5; 320/29; 320/32
[58] Field of Search ...................... 320/2, 5, 9, 25, 320/26, 29, 32, 14, 39, 40, 48, 52; 429/99, 123, 149, 152, 157, 162, 163; 361/680, 681, 682, 683, 684, 685, 686

[56] References Cited

U.S. PATENT DOCUMENTS

| | | | |
|---|---|---|---|
| 3,437,905 | 4/1969 | Healy et al. | 321/19 |
| 3,594,628 | 7/1971 | Gutzmer et al. | 320/6 |
| 5,121,047 | 6/1992 | Goedken et al. | 320/39 |
| 5,193,220 | 3/1993 | Ichinohe et al. | 455/89 |
| 5,218,284 | 6/1993 | Burns et al. | 320/14 |
| 5,226,540 | 7/1993 | Bradbury et al. | 206/576 |
| 5,305,238 | 4/1994 | Starr, III et al. | 364/569 |
| 5,368,956 | 11/1994 | Gruenstern et al. | 429/131 |
| 5,375,800 | 12/1994 | Wilcox et al. | 248/118.1 |
| 5,408,170 | 4/1995 | Umetsu et al. | 320/39 |
| 5,412,307 | 5/1995 | Yoshimatsu | 30/44 |
| 5,459,388 | 10/1995 | Illingworth et al. | 320/2 |

OTHER PUBLICATIONS

1990 Linear Databook, *Linear Technology*, "LT1070/LT1071 5A and 2.5A High Efficiency Switching Regulators." pp. 5–37 thru 5–41, 5–44 thru 5–48.

*Primary Examiner*—Peter S. Wong
*Assistant Examiner*—Gregory J. Toatley, Jr.
*Attorney, Agent, or Firm*—Majestic, Parsons, Siebert & Hsue

[57] ABSTRACT

A plurality of rechargeable batteries are provided as part of an electronic system that includes an electronic circuit which controls periodic charging of the batteries and allows selection of the output voltage over a given range. The system is preferably packaged in a shape to be easily integrated with a carrying case, such as a briefcase, and/or to physically match a specific type of portable equipment, such as a notebook computer. In one embodiment, the batteries and circuitry are included in a wrist rest structure of a type used with portable computer keyboards. In other forms, the power supply is useable with a large number of other specific items of portable electronic equipment, such as portable video and telecommunications equipment.

6 Claims, 8 Drawing Sheets

RECHARGEABLE BATTERY POWER SUPPLY WITH LOAD VOLTAGE SENSING, SELECTABLE OUTPUT VOLTAGE AND A WRIST REST

CROSS-REFERENCE TO RELATED PATENT APPLICATION

This is a continuation-in-part of application Ser. No. 08/188,471, filed Jan. 27, 1994, now abandoned.

BACKGROUND OF THE INVENTION

This invention relates generally to power supplies for portable or mobile electronics equipment, and, more specifically, to portable power supplies including battery storage.

Use of a wide variety of portable electronic devices is increasing rapidly. One class of such devices includes notebook computers, electronic organizers, sophisticated calculators, and the like. Another class of such devices includes video cameras and other video equipment. Telecommunications products, such as telephones, telefax machines, and the like, are increasingly being used in portable form. Various other types of portable electronic equipment also find widespread use, including radios, television sets and the like. In all such equipment, the power is supplied by batteries, either in a replaceable, non-rechargeable form or of a rechargeable type. The batteries are usually contained within each piece of equipment itself, or in a battery pack that is removably attached to the equipment. An auxiliary low voltage DC power input receptacle is generally always provided. Any internal rechargeable battery is charged by supplying power through the same input receptacle. An external power supply is usually required to interconnect such a receptacle with available AC house current is supplied Since there is very little standardization of battery and power supply requirements, it becomes very inconvenient when a user is carrying more than one piece of equipment at a time. Each such piece of equipment can require its own special type of battery or battery pack and/or external operating or recharging power supply. It can be very awkward to have to carry separate battery packs and/or power supplies for each of several pieces of portable electronic equipment. Further, if the user desires to be able to operate or recharge each of several pieces of equipment from more than one source, such as from both AC house current and a car battery, for example, it may be necessary for the user to carry two or more separate power supplies and/or types of interconnecting cables for each piece of equipment. There is very little standardization in both the electrical and mechanical (types of plugs, etc.) interfaces with external power supplies.

Therefore, it is a primary object of the present invention to provide an external power supply for such equipment that overcomes these disadvantages to the user.

It is a more specific object of the present invention to provide a power supply that is adaptable for use with a wide variety of types of portable electronic equipment and various types of power sources.

It is a further object of the present invention to provide a power supply for portable electronic equipment in a form that is easy to carry and use.

SUMMARY OF THE INVENTION

These and additional objects of the present invention are realized by its various features which can be grouped together for discussion purposes into three aspects of the present invention, any one of which can be implemented independently or in combination with one or more of the other aspects of the present invention.

According to a first aspect, a portable power supply includes one or more rechargeable batteries along with an input electronic circuit to control charging of the battery and an output electronic circuit for configuring the interconnection of the battery supply with portable electronic equipment. The input and output circuits are independently controllable and, in a preferred implementation, each utilizes its own controllable DC-to-DC converter integrated circuit chip. The input circuit is adapted to charge the internal battery of the power supply from a variety of input sources of various voltages, both AC and DC, and, in the case of a DC supply, being independent of its polarity. The output circuit is adjustable to conform the supply to the requirements of a piece of equipment to which it is attached.

According to a second aspect of the present invention, this or some other type of power supply is installed in a wall of an item of hand carried luggage, such as an ordinary briefcase or a specially designed case to carry the portable equipment. The installation may either be integral with the structure of the item of luggage or in a separate removable case. Thin rechargeable batteries are preferably utilized so that they may be conveniently installed side-by-side along a wall of such a piece of luggage without significantly decreasing the carrying space within the luggage or increasing its size. Various input and output plugs, controls and battery status indicators are conveniently located for use when the piece of luggage is opened. Alternatively, any or all of the plugs, controls and indicators may be positioned on the outside of the luggage, as desired.

According to a third aspect of the present invention, this or some other type of power supply is installed in a wrist wrest that is used in conjunction with a notebook computer or other portable electronic equipment requiring both a portable power supply and a rest for the wrists of its user. The same thin, rechargeable batteries are installed side-by-side in a thin base upon which the portable equipment is placed. A raised, cushioned wrist rest is attached to a forward side of the base and includes the recharging electronics, controls, plugs and the like. An electrical power connection is established between the power supply and the portable equipment sitting on the base. Practically no more space is required for such a power supply than for a wrist rest alone.

According to a fourth aspect of the present invention, the output circuit of the power supply is optionally provided with a control circuit for automatically setting the output voltage to correspond with that required by a particular item of portable equipment of the type that has its own internal battery. The control circuitry initially senses the voltage and polarity of the internal battery of the equipment when its external power supply jack is connected with the output of the power supply. The voltage and polarity of the power requirements of equipment are then determined and the output circuit of the power supply is automatically adjusted accordingly. Subsequent to this adjustment, the power supply is automatically enabled to provide the required voltage and polarity to the piece of equipment.

Additional objects, features and advantages of the various aspects of the present invention can be understood from the following description of its preferred embodiments, which description should be taken in conjunction with the accompanying drawings.

DESCRIPTION OF THE PREFERRED EMBODIMENTS

Figure 1:
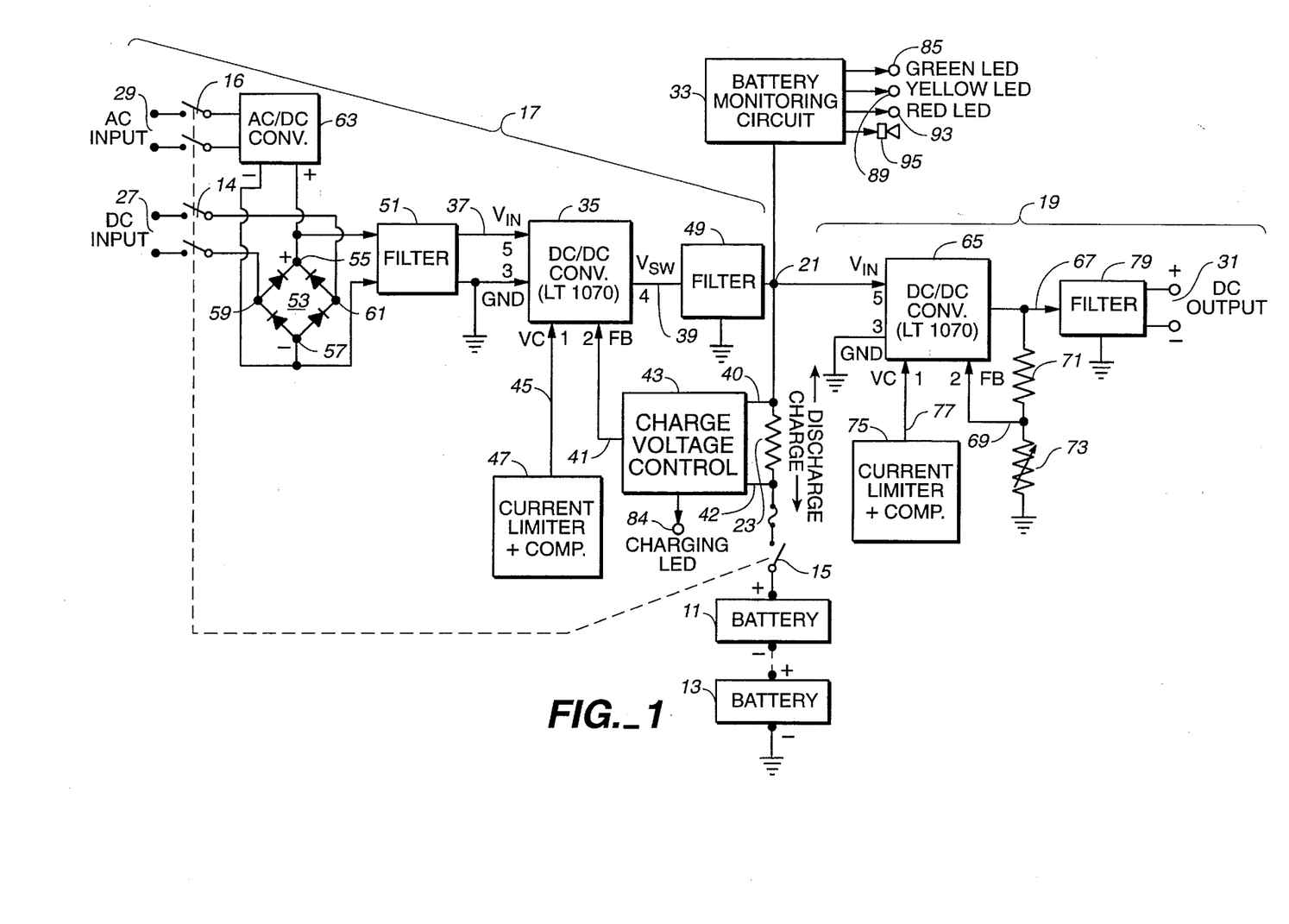
FIG. 1 is a block diagram of the electronic power supply system according to the present invention.

In a specific implementation of a power supply according to the present invention, with reference to FIG. 1, a plurality of batteries 11–13 are connected in series between an on-off switch 15 and a common ground terminal. In the specific example being described, six 2-volt lead acid batteries are connected in series to provide a 12-volt battery supply. Preferred for ease of packaging are thin, rectangularly shaped batteries available from Portable Energy Products, Inc. Each of the batteries has a charge capacity of five ampere-hours. Each of these batteries has a rectangular size of less than about 5½ by 3 ¼ inches and a thickness that is about ⅓ inch or less.

The circuit of FIG. 1 includes an input battery charging portion 17 and an output equipment interface portion 19. The input portion 17 drives a DC current through a node 21 and a resistor 23 through the batteries 11–13 from either a direct current source applied to terminals 27 through an on-off switch 14, or an alternating current source applied to terminals 29 through an on-off switch 16. The switches 14, 15 and 16 are preferably arranged to be operated together through a single actuator. The output circuit 19 responds to the voltage at the node 21, from either the batteries 11–13 or the input circuit 17, to provide the correct voltage at output terminals 31 for connection with an item of portable electronic equipment being powered. As will be seen from the following description, each of the input circuit 17 and output circuit 19 are independently configurable to match the characteristics of an available power source and the needs of the portable equipment, respectively. Additionally, the example power supply of FIG. 1 includes a battery monitoring circuit 33 that gives the user an indication of the charge remaining in the batteries 11–13. This is particularly useful when a portable computer or other device having volatile memory is being supplied from the batteries 11–13 through the output terminals 31, so that the user may take steps to back up such memory or recharge the batteries before the output voltage at the terminals 31 drops below that which can sustain operation of such a volatile memory.

A primary component of the input circuit 17 is a DC-to-DC converter integrated circuit 35 of a type that is commercially available as a separate chip product. Such a circuit receives a DC voltage input in a line 37 and provides a DC output in a line 39. A maximum output voltage is set by a control voltage in a line 41. A control circuit 43 is provided in the input circuit of the power supply of FIG. 1 in order to generate that control voltage. Further, it is desirable that the circuit 35 allow for the control of the maximum amount of current that can be drawn through its input 37, in order to be able to use available DC charging power supplies connected to the input terminals 27 that have a limited current capability. The maximum input current is adjusted by connecting a current limiting circuit 47 to a line 45. The voltage output 39 passes through a smoothing filter 49 to the node 21 for charging the batteries 11–13 through the series resistance 23.

A preferred commercially available circuit for the DC-to-DC converter 35 is part no. LT1070 (switching regulator) of Linear Technology. Indeed, the pin numbers and signal abbreviations noted on the part 35 of FIG. 1 correspond to the nomenclature used for the LT1070 part by its manufacturer.

Rather than connecting a DC charging input directly from terminals 27 to the input 37 of the integrated circuit 35, two additional circuit portions are interposed therebetween. One is a smoothing filter 51 through which the input current passes. Another is a four diode bridge 53 having output nodes 55 and 57 that remain at the same polarity regardless of the polarity of DC voltage from the input terminals 27 that is connected with input terminals 59 and 61 of the bridge 53. That is accomplished by the four diodes being connected with the polarity shown in FIG. 1 between the four nodes 55, 57, 59 and 61.

The DC input power will generally be connected with the input terminals 27 through a small transformer and rectifier (not shown) of the type commonly used with portable equipment. Such a device is plugged into ordinary house current and its low voltage output line is then plugged into the portable equipment. An advantage with using the power supply shown in FIG. 1 is that only a single such transformer and rectifier DC supply device need be utilized for a wide variety of portable equipment. However, these small power supplies are usually capable of providing only a small current. Optionally, the function of such an external DC supply may be provided by an AC-to-DC converter circuit 63 provided as part of the power supply of FIG. 1. Ordinary house current applied to input terminals 29 is then converted to a DC supply provided to the input of the filter 51, in parallel with output terminals 55 and 57 of the bridge circuit 53. Alternatively, a car battery, or other such DC source with a high current capability, may be connected to the input terminals 27.

The output circuit 19 will now be briefly described. A second DC-to-DC converter integrated circuit chip 65 has an input connected to the node 21 for drawing current from the batteries 11–13 through the series resistance 23. The circuit 65 is also preferably the available part LT1070 described above. An output in a line 67 has a voltage that is selected by a voltage applied to a line 69 from a voltage dividing circuit of a fixed resistance 71 in series with a variable resistance 73. Further, a maximum current draw from the batteries 11–13 is set by a current limiting circuit 75 connected to the chip 65 through a line 77. The variable resistance 73 is preferably in the form of a rotary switch having various fixed resistances connected to it in a manner to allow a step-function incremental increase in the resistance as the switch is rotated in one direction and a similar decrease in resistance as the switch is rotated in the other direction. The values of the resistances are chosen to provide a choice of voltages at the output 31 which correspond to standard battery voltages. By making the resistance 73 variable, instead of it being fixed and the resistance 71 variable, an undesirable high voltage output in the line 67 is avoided in case the rotary switch inadvertently breaks contact. Rather, in the configuration shown in FIG. 1, such a break will cause the voltage to go to zero rather than undesirably high. The output voltage in a line 67 is applied to the output terminals 31 of the power supply through a smoothing filter 79.

Figure 2:
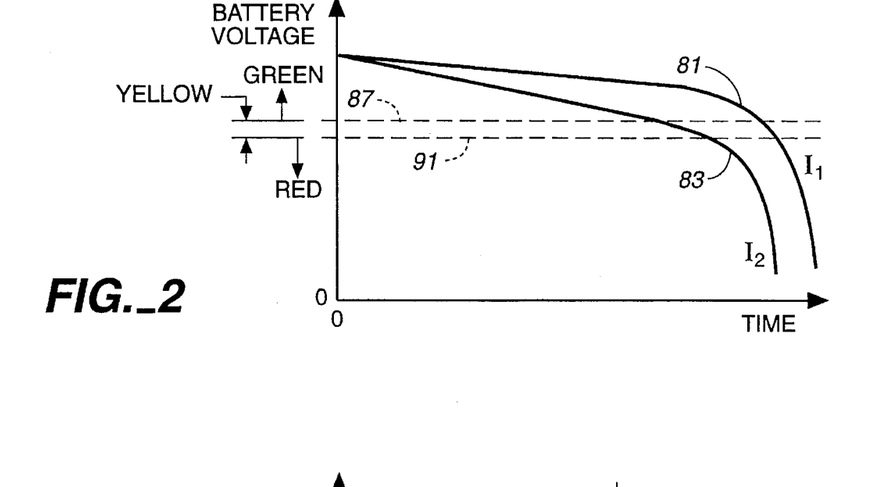
FIG. 2 include curves that show the detection of a low voltage condition of lead acid type of batteries used in the power supply of FIG. 1.

The operation of the battery monitoring circuit 33 of FIG. 1 will now be described with respect to battery voltage curves 81 and 83 of FIG. 2. An advantage of using a lead acid type of battery for each of the batteries 11–13 is that its voltage declines essentially linearly as they become discharged, until a point is reached where the voltage rapidly drops off. The curves 81 and 83 of FIG. 2 illustrate such a characteristic discharge for different steady state currents $I_1$ and $I_2$, respectively. A higher current $I_2$ being drawn from the batteries causes a more rapid decline in their output voltage. However, the discharge characteristics are similar enough over the current ranges drawn by portable electronic equipment that thresholds may be established and detected by the monitoring circuit 33 in order to provide the user with a useful indication as the batteries become discharged.

In the embodiment being described, a green light emitting diode (LED) 85 (FIG. 1) is lit so long as the battery voltage remains above a threshold 87 (FIG. 2). When the circuit 33 detects that the battery voltage at the node 21 has fallen below the threshold 87, the green LED 85 is turned off and a yellow LED 89 is turned on. As the voltage falls further, below a threshold 91, the yellow LED 89 is turned off and a red LED 93 is turned on. Simultaneously with the red LED 93 being illuminated, an audio alarm may be sounded by a device 95. At this point, the battery is either in or approaching the point of its characteristic curve shown in FIG. 2 where the output voltage drops precipitously. If the user is powering portable equipment with volatile memory in it, or some other device that cannot tolerate a power interruption, then the user is alerted in plenty of time by the series of three lights to take some appropriate action to avoid power being lost to the portable equipment. Standard voltage threshold circuits are employed in the battery monitoring circuit 33 to implement the illumination of only one of the LED's 85, 89 or 93 at a time.

An advantage of the output circuit 19 (FIG. 1) is that, although the battery output voltage gradually declines as current is drawn from it (FIG. 2), the voltage at the output terminals 31 remains essentially constant. This is due primarily to the operation of the DC-to-DC converter chip 65. But when the battery voltage drops to some low level, the voltage at the output 31 suddenly drops from that constant value to essentially zero. Therefore, the monitoring circuit 33 and indicators are quite important in applications where this cannot be permitted to occur.

Figure 3A:
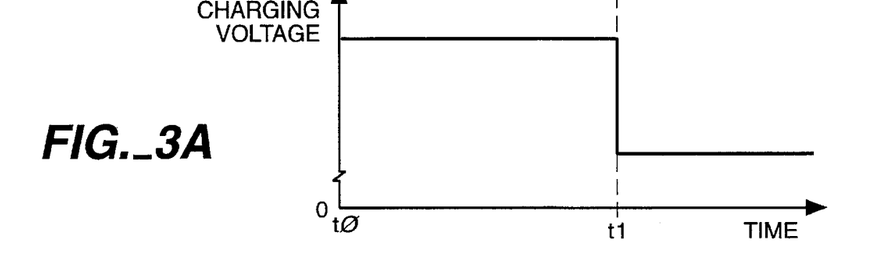
FIGS. 3A, 3B and 3C show battery charging characteristics of the circuit of FIG. 1 when the input power source has a sufficient current capability to satisfy the needs of the battery being charged.
Figure 3B:
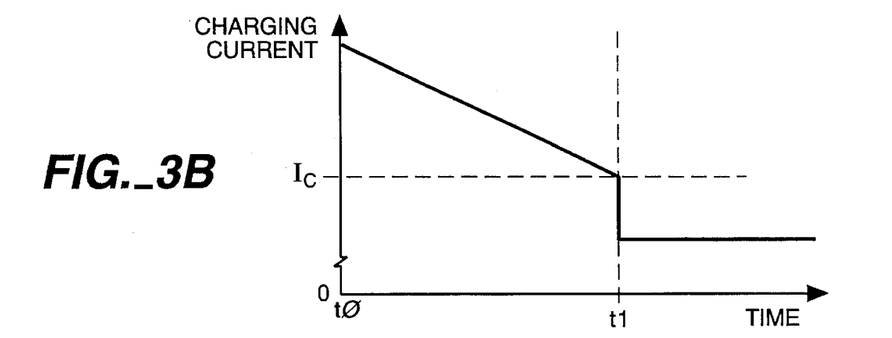
Figure 3C:
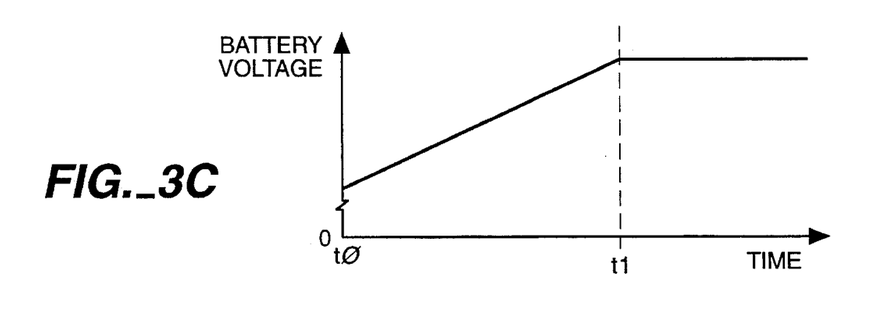

Referring to FIGS. 3A, 3B and 3C, operation of the input circuit 17 of FIG. 1 to charge the batteries 11–13 will be described. The voltage control circuit 43 normally provides a fixed voltage in the line 41 such that the output voltage in line 39 is a maximum during battery charging which extends from a time t0 and time t1. For a 12-volt battery system, in a specific example, the charging voltage is set for about 15 volts. During this interval, FIG. 3A shows the charging voltage at the node 21 to be constant while the battery voltage itself, as shown in FIG. 3C, is increasing. As the battery voltage increases, the current drawn by it decreases, as shown in FIG. 3B. At a time t1, the batteries are fully charged at about 13.6–13.8 volts. The charge voltage control circuit 43 preferably includes a comparator which, by monitoring the voltage drop across the resistor 23 during charging, abruptly changes the control voltage in the line 45 when the charging current to the batteries 11–13 falls to a level $I_c$. This is shown to occur at time t1 in FIG. 3B. The charge voltage control circuit 43 thereafter provides a control voltage in the line 41 that maintains a low charging voltage in output line 39 after time t1, as shown in FIG. 3A. The result is to maintain a small charging current to the batteries 11–13 after the time t1 and indefinitely thereafter. The voltage control circuit 43 also connects its comparitor output with a charging LED 84 that is viewable to the user during the high current charging between times t0 and t1. As the comparitor switches its output at the time t1, the charging LED 84 is caused to turn off.

Figure 4A:
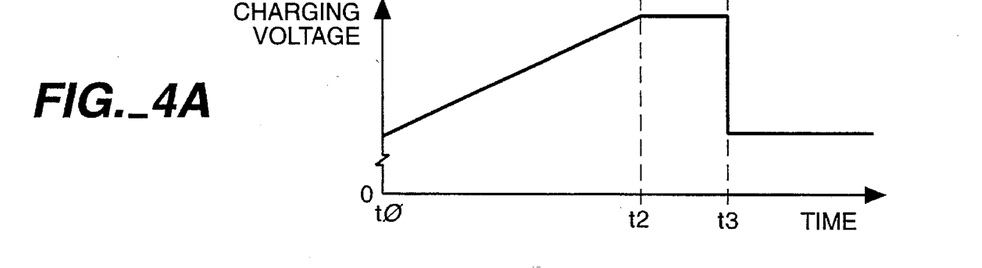
FIGS. 4A, 4B and 4C illustrate battery charging by the circuit of FIG. 1 when a limited amount of current is available from the external power source.

The example of an operation of the input charging circuits 17 (FIG. 1) with respect to the curves of FIGS. 3A, 3B and 3C assumes that the current limiter 47 has been set to allow the chip 35 to draw at its input 37 as much current as is required to provide the current of FIG. 3B to the batteries when a constant voltage output is maintained in its line 39. When this amount of current is not present, however, as can occur when the charging source is in external low-powered transformer and rectifier unit of the type currently used with portable equipment, the current limiter 47 is adjusted to limit the maximum amount of current draw. Such a case is illustrated by the operational curves of FIGS. 4A, 4B and 4C, which correspond, respectively, with FIGS. 3A, 3B and 3C. As FIG. 4B indicates, the battery is charged with a constant current from time t0 until time $t_2$. The circuit chip 35 adjusts the voltage output in line 39 between these times, as shown in FIG. 4A, in order to maintain the maximum current draw in its line 37 input, as set by the current limiter 47. The current applied to the battery between times t0 and $t_2$ is thus also constant. As shown in FIG. 4C, the battery voltage gradually increases between these times.

Figure 4B:
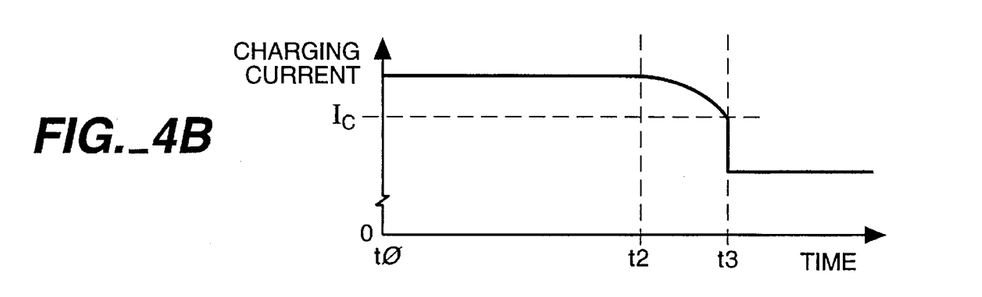
Figure 4C:
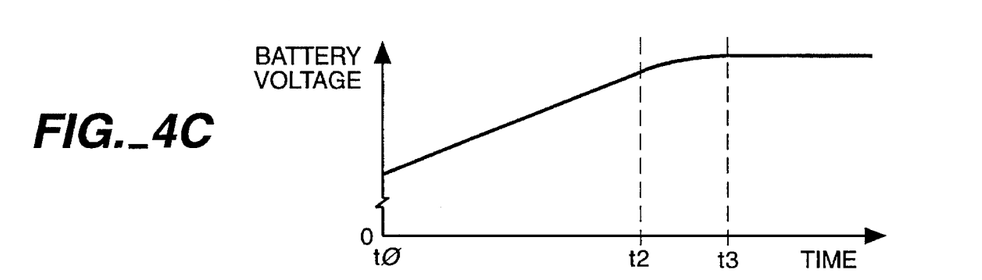

At time $t_2$ in the example illustrated in FIGS. 4A, 4B and 4C, the charging voltage output of the chip 35 in line 39 reaches its maximum value set by the control circuit 43. The voltage then remains flat after that time, and the charging current begins to decrease, as shown by FIG. 4B. When that current drops to a threshold level $I_c$, at which point the comparator within the control circuit 43 switches its output level, the output voltage in line 39 drops to a maintenance level as shown in FIG. 4A. A small maintenance current, as shown in FIG. 4B, then persists after time t3. Also at time t3, the charging LED 84 is turned off, showing the user that the charging process has been completed.

Figure 5:
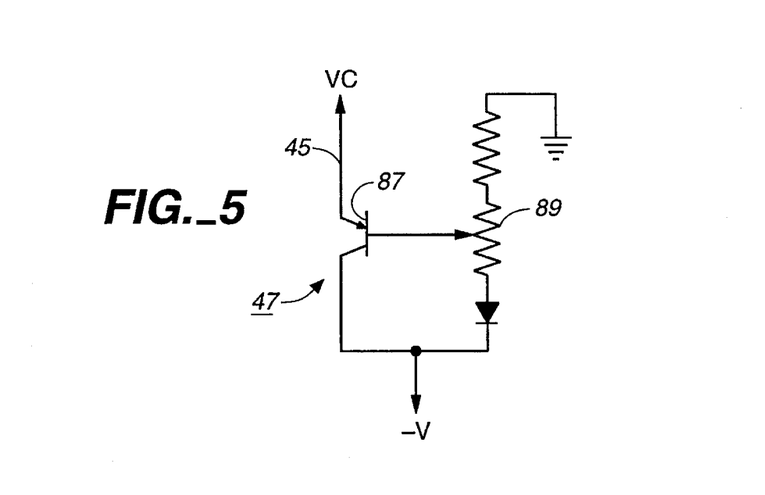
FIG. 5 illustrates the current limiter circuit of the input charging circuit of the power supply of FIG. 1.

FIG. 5 illustrates an example of the current limiting circuit 47. A transistor 85 has its emitter and collector connected between the chip control line 45 and a voltage supply terminal. A base of the transistor 87 is given a voltage that is adjustable by connection to a potentiometer 89. This potentiometer is connected in series, between the inverted voltage supply and ground potential, with a fixed resistance and a diode. An adjustment of the potentiometer 89 controls the maximum amount of current that the integrated circuit chip 35 will draw through its input line 37. For a general application circuit, this is set to limit the current input to that which can be supplied by the usual charging transformer and rectifier that a user may connect with the DC input 27 (FIG. 1). That is, the maximum input current draw is set to be approximately equal to the current supply capability of the least powerful supply for a, given voltage. As an example, for currently available supplies, the maximum input current in amperes is set by the circuit 47 to be about one-tenth of the supply voltage in volts.

The integrated circuit chip 65 of the output circuit 19 is similarly controlled. The current limiting circuit 75 is of the same form illustrated in FIG. 5, except the potentiometer is there set to provide a limit on the amount of the current that the chip 65 will draw from the batteries through node 21. This maximum current is set to be consistent with a maximum sustainable current capability of the batteries themselves, and the likely current draw of equipment connected to the output terminals 31. The variable resistor 73 is adjusted by the user to provide the proper voltage at the output terminals 31 for the electronic device that is connected to the output.

Figure 6:
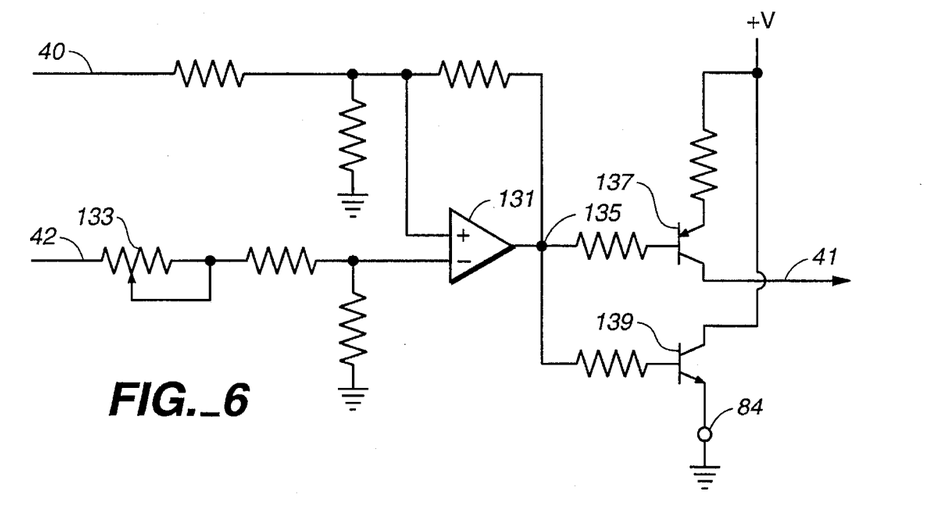
FIG. 6 is a circuit diagram of an example charge voltage control circuit of the power supply of FIG. 1.

FIG. 6 shows an example circuit implementation of the charge voltage control 43, whose operation has been described previously. A comparator 131 has inputs connected to lines 40 and 42 (see FIG. 1) and several resistors, variable resistor 133 allowing a threshold level of the voltage between lines 40 and 42 to be set at which an output 135 of the comparator 131 is switched. This output drives the bases of transistors 137 and 139, the former having line 41 driven by its collector and the latter having its emitter connected to the charging LED 84.

Another application of the power supply of FIGS. 1–6 is as an uninterruptible power supply (UPS). When used in this way, the notebook computer or other portable equipment is normally supplied through the circuit from its AC or DC input power source. The batteries provide a backup source of power in case of an unexpected loss of the input power source. This transition happens in a way that is transparent to the user. This configuration also prevents "aging" of internal equipment batteries by allowing them to be removed completely from the portable equipment while operating at a stationary location where a AC or DC power source is available. This prevents charging process from degrading portable equipment batteries.

Figure 7:
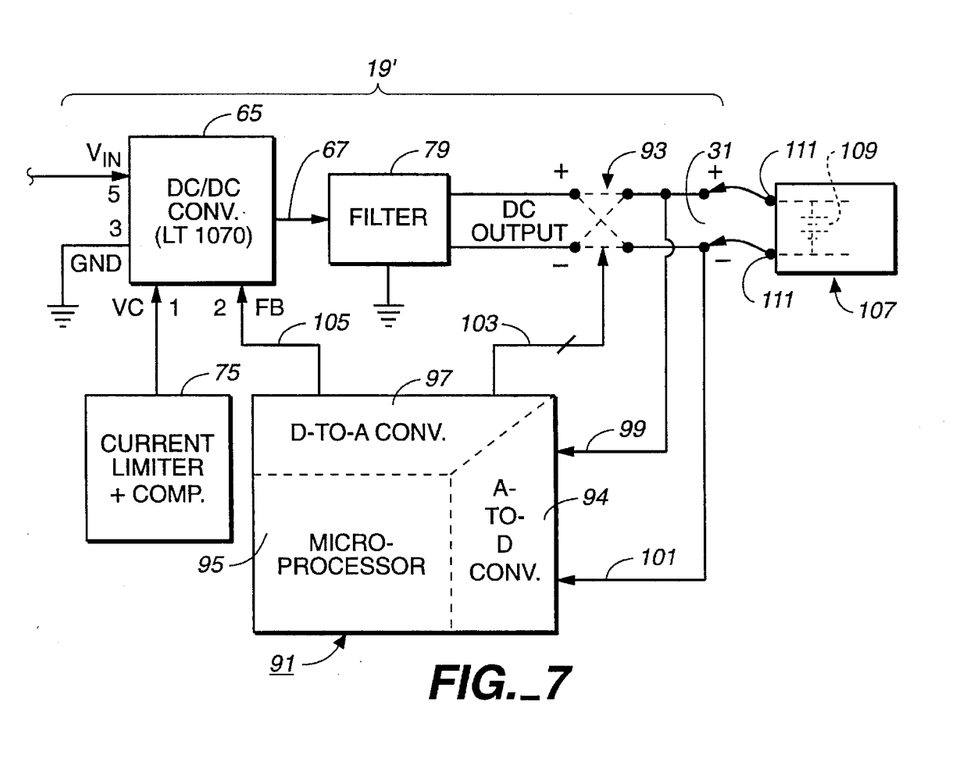
FIG. 7 shows an alternative output circuit for the power supply of FIG. 1 wherein its output voltage and polarity are automatically adapted to that of the equipment to which it is attached.

Referring to FIG. 7, a modified output circuit 19' is shown. Elements of the circuit of FIG. 7 which are the same as those within the output circuit 19 of FIG. 1 are given the same reference number. But instead of a manual voltage adjustment 73, as shown in FIG. 1, a control integrated circuit chip 91 and a semiconductor switching network 93 are substituted. The control chip 91 may be one of a commercially available type that includes an analog-to-digital converter 94, a microprocessor 95 and a digital-to-analog converter 97. The terminals 31 are connected to the converter 94 by lines 99 and 101 in order to provide data input to the control chip 91. An output line 103 from the converter 97 controls the state of the switching network 93. The switching network 93 is capable of breaking the connection between the output of the filter 79 and the output terminals 31, connecting them in one polarity and then connecting them in another polarity, as indicated by the dashed lines of FIG. 7. Another output of the converter 95, in a line 105, provides the control to the chip 65 of its output voltage 67.

The modified output circuit of FIG. 7 is capable of automatically adjusting the polarity and voltage at the output terminals 31 for a class of electronic devices, such as a device 107, that includes an internal battery 109 connected across power input terminals 111. The output circuit 19' operates o initially sense the voltage and polarity of the internal battery 109, which is then taken to be the input voltage and polarity to which the device 107 must be supplied by the output circuit 19'. This voltage is sensed by a process wherein the control chip 91 initially causes the switch 93 to be opened, and to thus read through the analog-to-digital converter 94 the voltage at terminals 31 to which the input terminals 111 of the portable electronic device 107 are connected. Even if the charge level of the battery 109 is very low, substantially no current need be drawn for the purpose of making the voltage measurement so the result should still be a determination of the voltage input specification of the device 107.

A microprocessor 95 is controlled by a simple routine that measures the digitized voltage measured across lines 99 and 101, as well as its polarity, and thus causes, through the digital-to-analog converter 97, the switch 93 to be configured for the proper polarity connection of the terminals 31 with the output of the filter 79, as well as setting the proper voltage in the line 105 to give an output voltage in the line 67 of the chip 65 that corresponds to the requirement of the device 107. Thus, the manual adjustments of the output circuit 19 of FIG. 1 are rendered automatic by the substitute output circuit 19' of FIG. 7.

As an alternative to the fully automated circuit of FIG. 7, a measurement of the voltage and polarity of the battery 109 may more simply be displayed to the user who then, in response, manually makes the voltage and polarity adjustments. In this variation, the controller 91 and switching circuit 93 are eliminated. They are replaced by a voltmeter that is connectable across the output terminals 31 through a momentary contact switch that also simultaneously disconnects the terminals 31 from the rest of the power supply circuit. The circuit of the resistor 71 and the potentiometer 73 (FIG. 1) are retained so that the user may adjust the potentiometer 73 in response to the voltmeter reading. The polarity of the connection of the device 107 to the power supply output terminals 31 is controlled by manually reversing the contacts.

Figure 8:
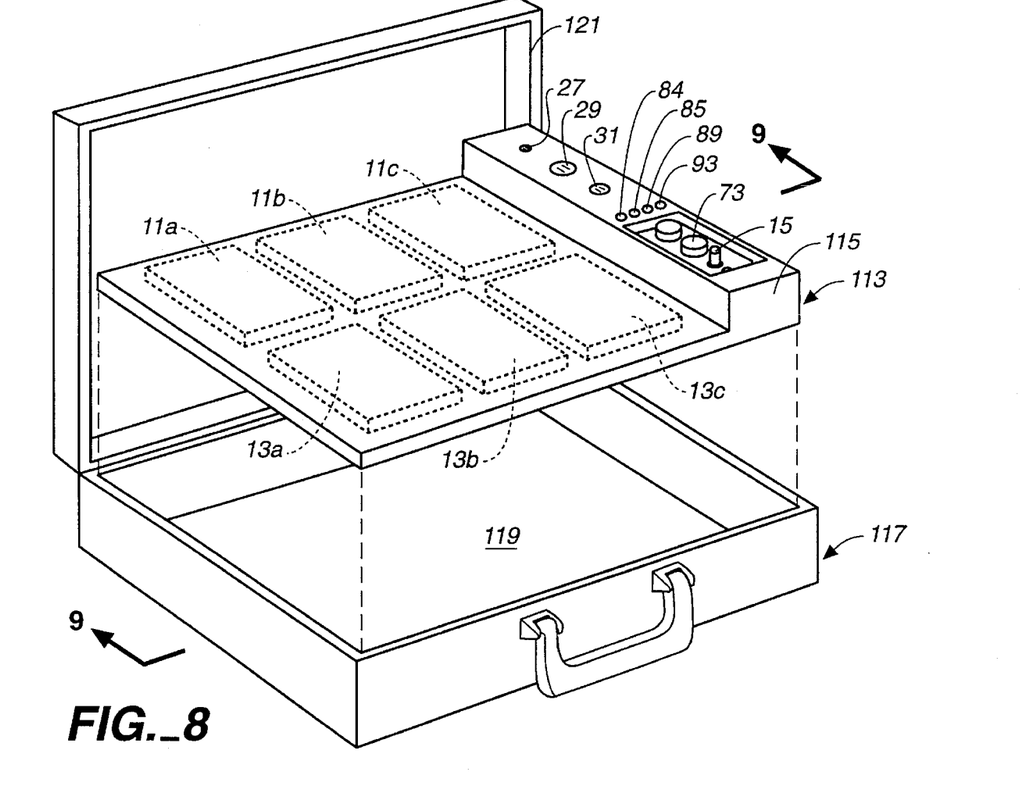
FIG. 8 illustrates one physical form of the power supply of FIGS. 1–6 that is suitable for removable insertion into an ordinary briefcase.

Referring to FIG. 8, an example physical configuration of the power supply described with respect to FIGS. 1–7 is given. An enclosure 113 is adapted to hold the thin, flat batteries 11–13 in a side by side relationship, as shown in dotted outline. This allows the thickness of the major part of the enclosure 113 to be only slightly more than the thickness of an individual one of the batteries 11–13. The electronics are included within a raised portion 115 of the enclosure 113, along one side thereof, with the controls, receptacles and indicating LEDs of the FIG. 1 system provided along a top surface. The shape of the underside of the case 113 is preferably made to snugly fit within a briefcase 117 against a wall 119 thereof. A height of the electronics portion 115 is made to be less than the depth of the sidewalls surrounding the wall 119. The hinged lid 121 is thus able to be closed in a normal fashion without any interference. Because of the very thin nature of the case 113, little internal volume of the briefcase is occupied by it, as shown in FIG. 9.

Figure 9:
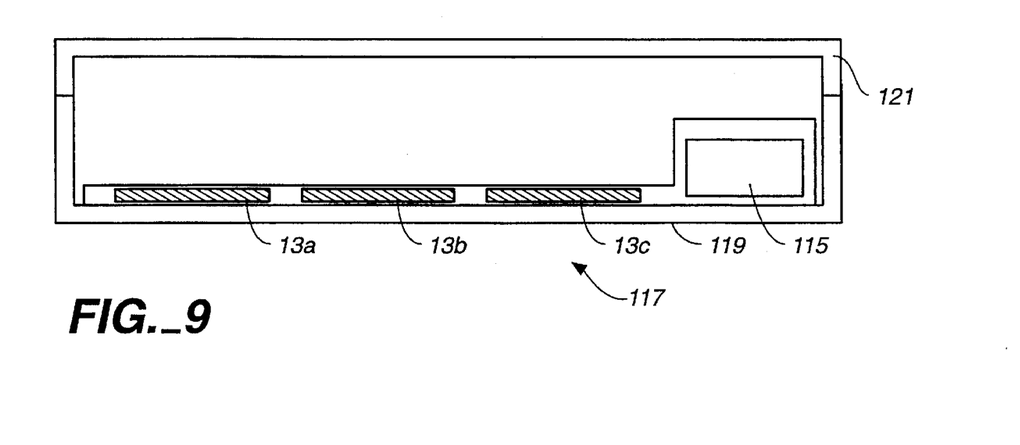
FIG. 9 is a cross-sectional view of the form of power supply shown in FIG. 8, taken at section 9—9 thereof.

It can be seen from FIG. 8 and 9 that the power supply within case 113 can easily be carried within the briefcase 117 whenever the user also has one or more electronic devices that would benefit from it. When such devices are not being carried, the user simply omits the power supply from the briefcase, if he or she desires.

Figure 10:
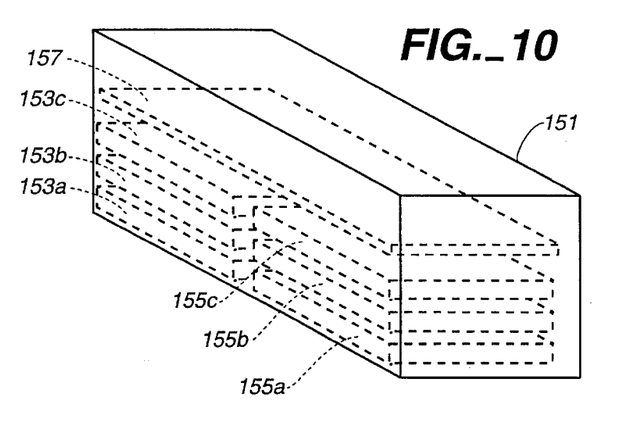
FIG. 10 illustrates another physical form of the power supply of FIGS. 1–6, also suitable for removable insertion into the briefcase of FIG. 8 in place of the power supply there shown.

Another physical configuration of the power supply of the present invention is illustrated in FIG. 10. A rectangularly shaped case 151 encloses the six batteries arranged in two vertical stacks, batteries 153a, 153a and 153c in one stack and batteries 155a, 155b and 155c in a second stack. These two battery stacks are positioned adjacent each other. A printed circuit board 157, positioned above and across both battery stacks, carries the electronic circuitry described above with respect to FIGS. 1–7.

Figure 11:
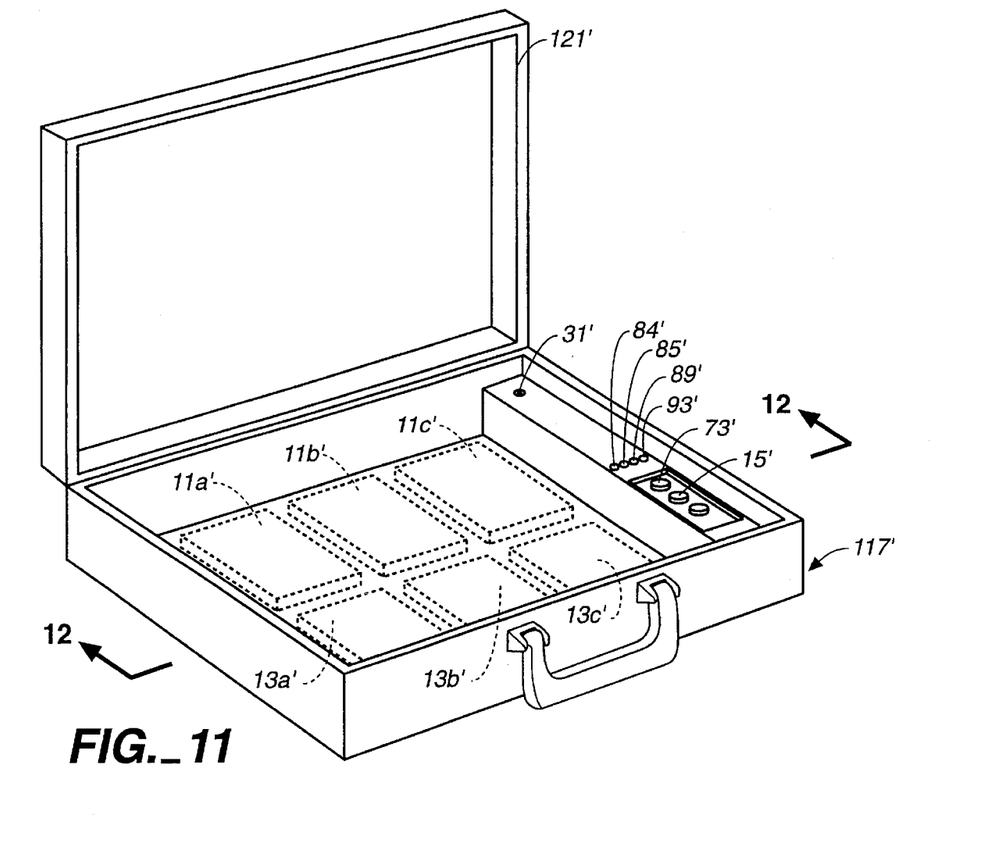
FIG. 11 illustrates yet another physical form of the power supply of FIGS. 1–6, wherein the supply is permanently built into a briefcase.
Figure 12:
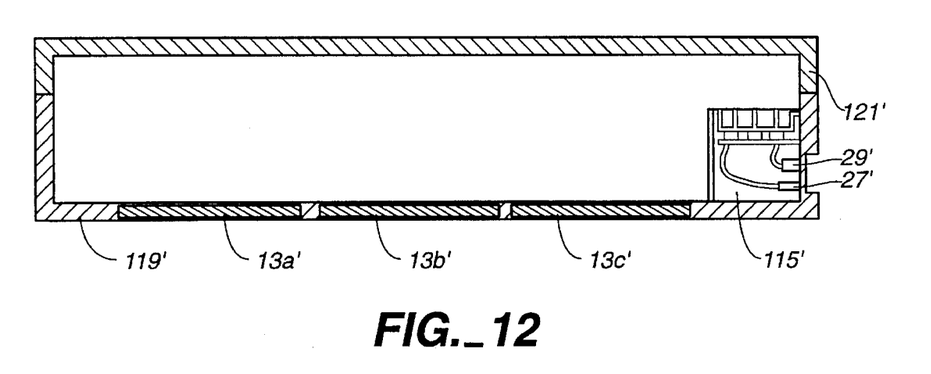
FIG. 12 is a cross-sectional view of the form of power supply shown in FIG. 11, taken at section 12—12 thereof.

Yet another physical configuration of the power supply of the present invention is illustrated in FIGS. 11 and 12. This embodiment is similar to that of FIGS. 8 and 9, the main difference being that it is permanently installed in an item of hand carried luggage such as a briefcase. Indeed, elements of the embodiment of FIGS. 11 and 12 which correspond to those of the embodiment of FIGS. 8 and 9 are identified by the same reference number but with a prime (') added. It will be noted that the batteries 11a', 11b', 11c', 13a', 13b' and 13c' are mounted within a wall 119' of the briefcase, with their edges of the thinnest dimension arranged adjacent to each other. The appearance of the briefcase is not noticeably changed. The electronic module is mounted within the briefcase along a bottom corner thereof, this module containing the electronic circuits of FIGS. 1–7. Various controls, indicators and plugs are positioned on a top surface of the module. This is the same as in the embodiment of FIGS. 8 and 9 except that the power input plugs 27' and 29' are preferably positioned along a sidewall of the briefcase in a manner to be accessible from its outside. This allows the user to charge the batteries without having to open the briefcase. All the other controls, indicators and output power plug 31' are made accessible when the briefcase is opened.

Figure 13:
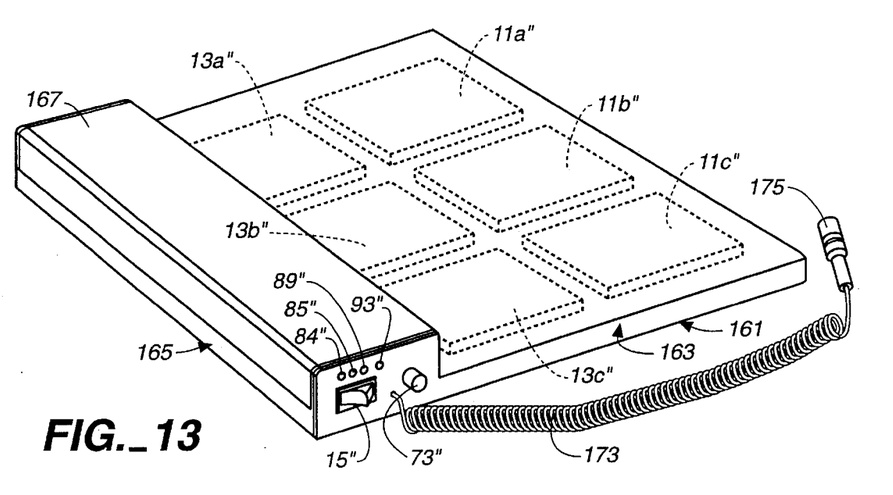
FIG. 13 illustrates a further physical form of the power supply of FIGS. 1–6, being built into a portable computer wrist rest.
Figure 14:
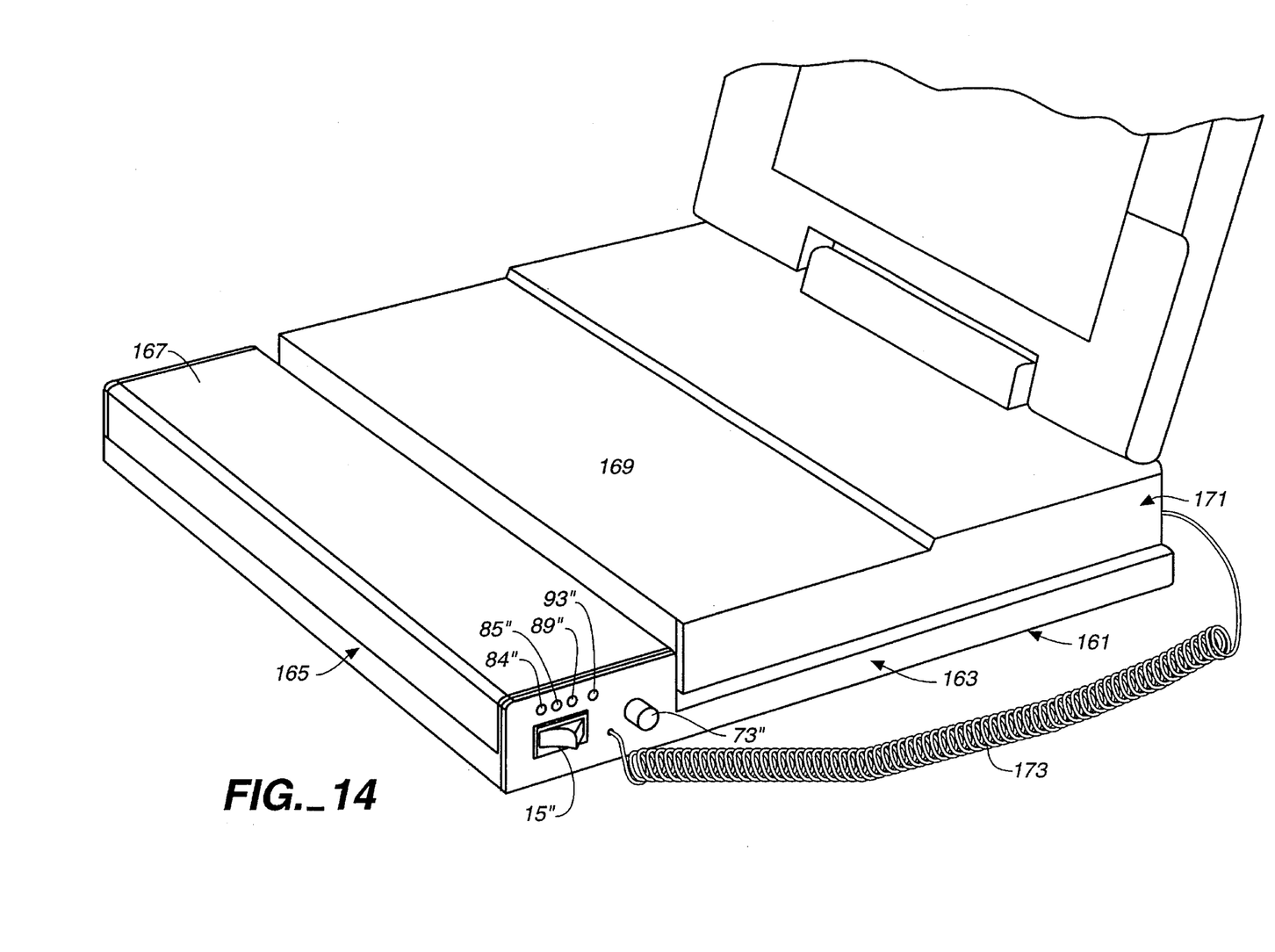
FIG. 14 shows the wrist rest form of the power supply of FIG. 13 when used with a notebook computer.

A further physical configuration of the power supply of the present invention is illustrated in FIGS. 13 and 14, where elements common with those of prior figures are identified with the same reference number as earlier used but with a prime (') or double prime (") added, as appropriate. A portable wrist rest accessory 161 is provided with the power supply of FIGS. 1–7. A thin base portion 161 contains batteries 11a', 11b', 11c', 13a', 13b' and 13c' arranged to minimize the thickness of the base 163. A strip 165 is integrally formed with the base 161, and includes a soft cushion 167 on its top surface for a user to rest his or her wrists when using a keyboard 169, or some other mechanical user interface, of a notebook computer 171, or some other portable electronic equipment. The electronic circuitry described with respect to FIGS. 1–7 is preferably implemented on a printed circuit board contained within the strip 165. The batteries can alternatively be arranged to extend into the strip 165 with the electronics mounted above them. The indicators and controls of that circuit are mounted on one end of the strip 165. A socket (not shown) for connection to a charging power source is mounted on an opposite end of the strip 165. Instead of providing a socket for the power supply output, a permanently attached cord 173 is used, a connector 175 being attached to a free end of the cord for removable connection with a power supply input to the notebook computer 171.

The top surface of the base 163 is made flat so that the usual flat bottomed portable equipment rests on it in a stable manner under the influence of its weight. The size of the base 163 is preferably made just slightly larger than the base of equipment contemplated for use with it. The height of the cushioned surface 167 is made, with respect to the top surface of the base 163, such that it is even with or slightly lower than the keyboard 169. This makes it comfortable for the user to operate the keyboard.

Because the weight of the batteries is substantial and evenly distributed under the notebook computer 171, a stable work platform is created. This is particularly useful when a portable computer is being used on an airplane by resting it on a narrow fold down tray table. The accessory 161 effectively extends the depth of the tray table.

Even though the power supply embodiments described above utilize a lead acid type of battery, the various aspects of the present invention can also be applied to supplies that use other available types of rechargeable batteries. For example, lithium ion batteries of substantially the same physical shape described above can be substituted, provided that the charging portion 17 (FIG. 1) of the system is adapted to its unique characteristics.

Although the various aspects of the present invention have been described with respect to preferred embodiments thereof, it will be understood that the invention is entitled to protection within the full scope of the appended claims.

It is claimed:

1. A method of adjusting a variable voltage at an output connection of a power supply to match a voltage of an internal rechargeable battery within a piece of electronic equipment that is connected to an external power input connection of said equipment, comprising the steps of:

electrically disconnecting the power supply from the power supply output connection, connecting the equipment power input connection to the power supply output connection while the power supply remains unconnected to the power supply output connection, automatically measuring the voltage of the internal equipment battery, adjusting the voltage output of the power supply to match that of the internal equipment battery, and connecting the voltage adjusted power supply to said output connection.

2. The method according to claim 1 wherein the adjusting step is accomplished automatically.

3. A power supply for use with portable electronic equipment, comprising:

a plurality of batteries that each have a thickness between flat parallel surfaces which is significantly smaller than dimensions of the surfaces, a rectangularly shaped base structure including bottom and top surfaces having said batteries held therebetween with their said surfaces parallel with the base surfaces, and a strip attached to the base structure along one edge thereof, said strip extending a distance above the top surface of the base and including power supply electronics connected with said batteries and with external controls and indicators mounted on the strip.

4. The power supply of claim 3 wherein the strip contains a cushion on a top surface thereof, thereby serving as a wrist rest for a user of a keyboard of a portable computer which is placed on the top surface of the base.

5. The power supply of claim 3 wherein the base structure is sized to fit within a carrying case with the bottom surface of the base structure held adjacent a wall of the carrying case.

6. The power supply of claim 3, wherein said power supply electronics includes:

a first integrated circuit connectable to a voltage supply external to said strip and connected to provide a selected maximum d.c. charging voltage to said batteries with a maximum current draw from said external voltage supply, a second integrated circuit receiving a d.c. voltage from said batteries and connected to provide a selected voltage to an output circuit, and means connected to said output circuit for removably connecting power to said portable electronic equipment.

* * * * *